C. M. SPENCER,

Assignor to THE HARTFORD MACHINE SCREW CO.

Machine for Making Metal Screws.

No. 9,290. Reissued July 13, 1880.

WITNESSES.

N. C. Whitney.

Jos. P. Livermore

INVENTOR.

Christopher M. Spencer by Crosby & Gregory Atty.

UNITED STATES PATENT OFFICE.

CHRISTOPHER M. SPENCER, OF HARTFORD, CONNECTICUT, ASSIGNOR TO THE HARTFORD MACHINE SCREW COMPANY, OF SAME PLACE.

MACHINE FOR MAKING METAL SCREWS.

SPECIFICATION forming part of Reissued Letters Patent No. 9,290, dated July 13, 1880.

Original No. 143,306, dated September 30, 1873; Reissue No. 5,836, dated April 14, 1874. Application for reissue filed April 14, 1880.

*To all whom it may concern:*

Be it known that I, CHRISTOPHER M. SPENCER, of Hartford, in the county of Hartford and State of Connecticut, have invented certain new and useful Improvements in Machines for Making Metal Screws, of which the following is a specification, reference being had to the accompanying drawings.

Figure 1:
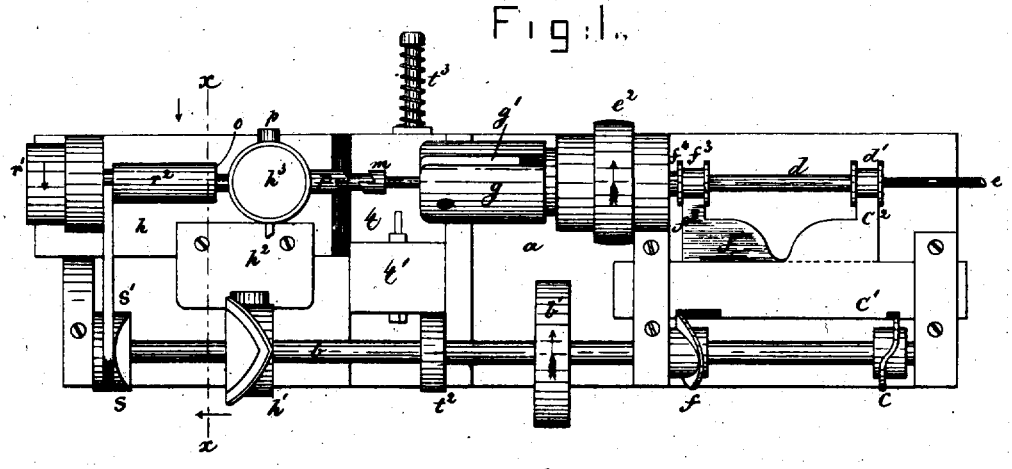
Figure 2:
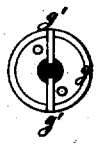
Figure 3:
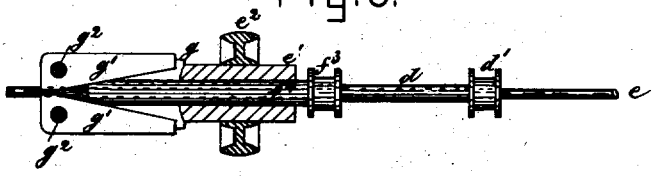
Figure 4:
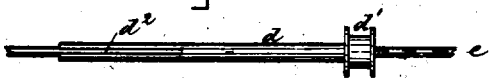
Figure 5:
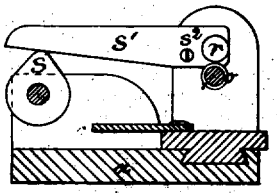
Figure 6:
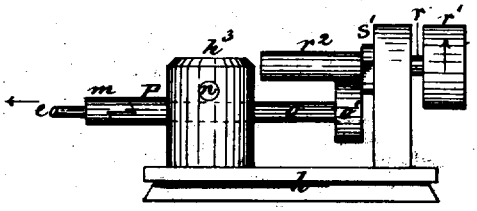

Figure 1 is a top or plan view of the whole machine. Fig. 2 is a view, in central longitudinal section, of the chuck and its immediate attachments. Fig. 3 is a view of the front end or mouth of the chuck. Fig. 4 is a detached view of the frictional feeding device which grasps and feeds forward the metal rod from which the screws are made. Fig. 5 is a transverse vertical section of the left of the machine on the dotted line *x x*. Fig. 6 is a side view of the tool-carriage detached from the machine.

The machine automatically makes screws upon the end of a rod. This my improved machine has been organized with especial reference to operate upon the end of a rod, form a screw, remove the threading-tool from the screw-thread cut on the rod, cut off the said screw, and then to automatically feed the rod forward and make another screw, and so on until the rod is exhausted.

By my plan the intermittent feeding of the rod is effected by a frictional feeding device made as a slotted rotating and reciprocating tube, and the rod is rotated by a rotating chuck having jaws, the chuck having no function whatever in the forward movement of the rod; and in connection with such mechanism to feed forward and rotate the rod at the proper time, I have combined and arranged a rotating tool-carrying turret, the tools of which are brought intermittingly into proper position to turn down and thread the end of the rod; and the screw having been threaded and the threading-tool removed from it, a cutting-off tool is moved forward and made to cut the screw from the end of the rod.

By feeding the rod forward by means of a friction-feed such as herein employed, rather than by a chuck, I am enabled to simplify the construction of the chuck, as it has but one motion—viz., that of rotation—and by employing a rotary tool-carrying turret and cutting-off tool, as hereinafter set forth, I am enabled to form and thread the screws and cut them off, all in the simplest and most expeditious manner, my mechanism, by reason of its simplicity and mode of operation, increasing the speed of manufacturing screws and decreasing their cost beyond what would be the case if the turning-down and threading tools were operated by independent carriers; and so, also, by withdrawing the threading-tool from the screw before it is cut from the rod the use of a screw-driver to remove the screw from the threading-tool is obviated.

The letter *a* denotes the base of the machine, and *b* the main shaft, driven by a belt running on the pulley $b'$. On the main shaft is a cam, *c*, for giving an intermittent reciprocating motion to the slide $c'$, for a purpose indicated hereinafter. An arm, $c^2$, upon this slide engages with the collar $d'$ of the frictional feed device or tube and causes it to reciprocate with the slide $c'$. Through the longitudinal center of the friction-feed or tube *d* passes the rod *e*, from which the screws are made.

The front end of the tube is slotted at $d^2$, and sprung together so as to embrace the rod *e* tightly enough to make it move longitudinally with the tube, except when the rod is grasped by the chuck *g*.

On the main shaft *b* is a cam, *f*, to intermittently reciprocate the slide $f'$, having an arm, $f^2$, engaging with the collar $f^3$ on the sleeve $f^4$. The friction-feed device or tube *d* runs inside the sleeve $f^4$, and the sleeve $f^4$ inside the shaft $e'$, rotated by a belt running on the pulley $e^2$. At the end of this shaft $e'$ is the chuck *g*, provided with two jaws, $g'$, pivoted at $g^2$.

The end of the sleeve $f^4$ is shown as made conical, in order that when forced forward between the jaws $g'$ it will act to press the rear ends of the jaws $g'$ outward and their front ends inward, so that they will pinch and hold the rod *e* to prevent longitudinal movement of it, yet cause it to rotate with the shaft $e'$.

When the tube *d* moves forward the jaws $g'$ $g'$ are opened, and the tube *d*, then grasping the rod, carries or feeds it forward, causing it to project beyond the mouth of the chuck *g* far enough to furnish material for a screw of the desired length. The rod having been fed forward the desired distance, the sleeve $f^4$ is moved forward, causing the jaws $g'$ $g'$ of the chuck to grasp and hold the rod $e$, so that when the tube $d$ moves backward it cannot carry the rod $e$ with it, the chuck, during the backward movement of the tube, causing the rotation of the rod $e$, so that it can be operated upon to make a screw.

The tool-carriage $h$, fitted in suitable ways on the frame, is reciprocated longitudinally by the cam $h'$ on the shaft $b$, the said cam engaging the wing $h^2$ at the side of the tool-carriage. This tool-carriage is provided with the rotating turret $h^3$. This turret has an intermittent or step-by-step rotation to bring, one at a time, its attached tools into position for operating on the end of the rod $e$ to form a screw.

The turret is rotated by means of a pawl and ratchet, one of which is attached to the turret and the other to the base, as is common in screw-machines.

In the drawings but two tools are shown attached to the turret—the forming-tool $n$, which cuts down the body of the rod $e$ to the proper diameter of the screw, and the screw-cutting die within the half-clutch $m$, which cuts the thread upon the screw.

The half-clutch $m$ is placed upon the shaft $o$, which runs through the turret, and can turn freely in it except when the carriage and turret are moved toward the chuck $g$, during which time the half-clutch $p$, fast on the turret, engages with the half-clutch $m$ and holds it stationary while a thread is cut upon the screw.

When the thread has been cut the die is run off the thread in the following novel manner: Overlying the rear end of the shaft $o$ is a shaft, $r$, driven by a belt on the pulley $r'$, the shaft $r$ rotating faster than the shaft $e'$. On the shaft $r$ is a friction-roll, $r^2$. The shaft $r$ is hung in loose or spring bearings, so that it may have some little play toward and from the shaft $o$. A cam, $s$, on the shaft $b$ operates the lever $s'$ pivoted at $s^2$ at the proper time, causing it to depress the shaft $r$ and bring the friction-roll $r^2$ into contact with the friction-roll $o'$ upon the shaft $o$, thus causing the shaft $o$ and screw-cutting die to revolve in the same direction with but faster than the shaft $e'$ and rod $e$, so that the screw-cutting die is run off the thread it has just cut by means of its acceleration of speed over the speed of the rod $e$. The cutting-off tool $t$, attached to the tool-block $t'$, moving back and forth transversely on the base $a$, (its forward movement given by the cam $b^2$ on the shaft $b$ and its return movement by the spring $t^3$,) now comes forward and cuts off the screw-blank from the rod $e$, after which the machine is again ready to go through the operation of making another screw.

In screw-machines heretofore made employing turrets to carry the different tools for forming the screws the operations of feeding the rod $e$, of rotating the turret, and of bringing up and carrying back the cutting-off tool have heretofore been performed by hand.

I am fully aware of United States Patent No. 120,044, October 17, 1871, containing a rotating spindle having springs to engage and hold the rod so that it will revolve with the spindle, and a reciprocating and rotating chuck to engage and feed the rod forward and rotate with it and move back over the rod while held by the springs of the rotating spindle. In this latter patent the threading-tool, carried by an independent arm, is made to form the thread at the end of the rod, and while the threading-tool yet retains within it the threaded end of the said rod a cutting-tool is made to sever the rod and leave the screw in the threading-tool, by which it is presented successively to the action of other tools to complete the head of the screw and slot it, after which the screw is extracted from the threading-tool by a screw-driver.

I do not broadly claim a rotating turret in a screw-machine, as I am aware that such turret is used in other screw-making machines; but I am not aware that a rotating turret provided with a series of tools has ever been employed in connection with automatic mechanism for progressively feeding forward a rod to the tools of the said turret, the turret being also automatically operated.

I do not claim anything shown in United States Patent No. 120,044.

I claim as my invention—

1. In a machine to automatically form screws from a rod, the combination of the sliding carriage, the rotating tool-carrying turret thereon, its threading-tool to cut a thread on the rod and then withdraw from the part of the rod so threaded, mechanism to grasp and rotate the rod, the cutting-off tool to separate the threaded screw from the end of the rod, as described, after the removal of the threading-tool, and means to operate the cutting-off tool at the proper time, all substantially as set forth.

2. In a machine to form a screw at the end of a rod, the rotating and horizontally-moving slotted friction-feed device and the rotating hollow shaft and chuck, combined with the sleeve located between the friction-feed device and the said hollow shaft, to operate the jaws of the chuck to hold the rod while the friction-feed device is being drawn backward, substantially as described.

3. The friction-feed device $d$, slotted as described, the hollow shaft and attached chuck, and the interposed conical-ended sleeve $f^4$, combined with means, substantially as described, to move the sleeve backward and release the jaws of the chuck from the rod, and to move forward the said friction-feed device to project the end of the rod beyond the end of the chuck far enough to insure proper length of rod for the screw it is desired to make.

4. In combination, the revolving chuck $g$, provided with jaws $g'$, the friction-feed device $d$, to grasp the rod and the sleeve $f^4$, the cam $c$, or its equivalent, to reciprocate the tube $d$ intermittingly to feed the rod forward, and the cam $f$, or its equivalent, to reciprocate the sleeve $f^4$ to close the jaws while the rod is being rotated and the tube $d$ drawn back, and to permit the jaws to be opened as the tube is moved forward to feed the rod forward, all substantially as described.

5. In a machine to automatically form screws at the end of a rod, the rotating friction-feed device or tube, the rotating chuck and its jaws, the interposed movable sleeve to close the said jaws upon the rod or permit them to release the rod, combined with the rotating turret provided with a turning-down and a threading tool, the reciprocating carriage upon which the said turret is mounted, and the cutting-off tool to cut the screw from the rod after the withdrawal of the threading-tool therefrom, and means to operate the said devices at the times herein stated, substantially as described.

6. The combination of the rotating tool-bearing turret $h^3$, carriage $h$, cam $h'$ with the cutting-off tool $t$, tool-stock $t'$, and cam $t^2$, all operating automatically, and all constructed, arranged, and designed for operation and use substantially as shown and described.

7. In a screw-cutting machine, the chuck to rotate the rod, combined with the screw-threading tool and its spindle, and with mechanism adapted to rotate the said spindle in the direction of rotation of the rod, but at a faster speed, to run the threading-tool from the screw formed at the end of the rod while held by the chuck, substantially as described.

8. The combination of the turret $h^3$, shaft $o$, friction-roll $o'$, the friction-roll $r^2$, the lever $s'$, and the cam $s$, or its equivalent, the whole constructed, arranged, and designed for operation and use substantially as set forth.

CHRISTOPHER M. SPENCER.

Witnesses:
E. I. POST,
WM. B. BROTHERTON.